United States Patent
Boerstler et al.

(10) Patent No.: US 7,321,651 B2
(45) Date of Patent: Jan. 22, 2008

(54) HIGH FREQUENCY CIRCUIT CAPABLE OF ERROR DETECTION AND CORRECTION OF CODE PATTERNS RUNNING AT FULL SPEED

(75) Inventors: David W. Boerstler, Round Rock, TX (US); Eskinder Hailu, Austin, TX (US); Jieming Qi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 10/988,285

(22) Filed: Nov. 12, 2004

(65) Prior Publication Data

US 2006/0117236 A1 Jun. 1, 2006

(51) Int. Cl.
*H03K 21/40* (2006.01)
(52) U.S. Cl. .............. 377/30; 377/28; 714/37; 714/40
(58) Field of Classification Search ........... 377/28, 377/30; 714/37, 40; H03K 21/40
See application file for complete search history.

(56) References Cited

U.S. PATENT DOCUMENTS 3,331,953 A * 7/1967 Rouzier .............. 377/28
6,486,717 B2 * 11/2002 Kinoshita et al. ............. 377/28
6,950,490 B1 * 9/2005 Koh et al. ..................... 377/28

FOREIGN PATENT DOCUMENTS

JP 02121411 A * 5/1990

OTHER PUBLICATIONS

Stan, M.R.; Synchronous up/down counter with clock period independent of counter size; Computer Arithmetic, 1997. Proceedings., 13th IEEE Symposium on; Jul. 6-9, 1997; pp. 274-281.*

* cited by examiner

*Primary Examiner*—R. Stephen Dildine
(74) *Attorney, Agent, or Firm*—Carr LLP; D'Ann N. Rifai

(57) ABSTRACT

A method, an apparatus, and a computer program are provided for generating an error detection state and correction of code patterns. Generally, conducting full speed testing of the dI/dt circuit in a low bandwidth lab environment is difficult. A circuit, however, can be employed that periodically detects the functionality of the dI/dt circuit to indicate success or failure. When errors are detected, the circuit allows for erroneous codes to be replaced with accurate ones. Using this circuit, conducting full speed testing of the dI/dt circuit in a low bandwidth lab environment can be more easily achieved.

18 Claims, 4 Drawing Sheets

HIGH FREQUENCY CIRCUIT CAPABLE OF ERROR DETECTION AND CORRECTION OF CODE PATTERNS RUNNING AT FULL SPEED

FIELD OF THE INVENTION

The present invention relates generally to error detection and, more particularly, to error detection patterns for code patterns at full speed.

DESCRIPTION OF THE RELATED ART

As the operating frequency of microprocessors has increased, the resulting power dissipation has become a major bottle-neck in implementing large high performance systems. As a result, the package and cooling cost necessary to deal with the large power dissipation is accounting for a larger portion of total chip cost. For low-power mobile systems, the battery life-time is directly related to the power dissipation of the chip. Therefore, it is sought to increase the shelf-life of batteries. One way this is achieved is by clock gating, wherein the clock input to non-active circuit blocks is reduced in frequency or disabled completely.

However, the process of scaling down the clock frequency introduces additional challenges. FIG. 1 displays a simplified diagram of an electronic system having a power supply source, a printed circuit board (PCB), package, and chip. Power supply is delivered at the PCB end. The chip would like to interact with a stable power supply that is not affected by transient current consumption. A stable power supply becomes critical as the operating power supply is reduced, since any transient supply voltage fluctuations at the chip can account for a large portion of the desired power supply. To reduce transient current induced power supply functions, one generally minimizes the series inductance and resistance, while adding a large decoupling capacitance between VDD and GND. Where dI/dt is very large, the transient supply voltage swing caused by the series inductance can become very large. Hence, it is essential to reduce dI/dt when the chip is switched between various modes of operation.

Transitions between serial and parallel modes for shift registers have inherent risks. The majority of the risk occurs during transitions from parallel to serial modes. Under such conditions, if the clock frequency is large, then there exists a high risk of the wrong state latching on the latches of the "bit n" in the shift register. Because the shift registers will be employed to mask the Phased Locked Loop (PLL) clock signals to generate lower frequency clocks, it is essential that one be able to load the parallel bits and observe the serial output of the shift register at fill speed to ensure the shift register contains the correct code.

Therefore, there is a need for a circuit capable of conducting full speed testing of the dI/dt circuit in a low bandwidth lab environment.

SUMMARY OF THE INVENTION

The present invention provides a method, an apparatus, and a computer program for generating an error detection state and correction of code patterns running at full speed. Based on pattern inputs a plurality shadow register outputs are generated. However, there are two different modes of operation to determine the error detection state signal: serial and parallel. Hence, for a shift register, a mode is selected. Once selected, a shift register outputs are generated based on the plurality of shadow register outputs. An error detection state signal is then generated from the plurality of shift register outputs.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
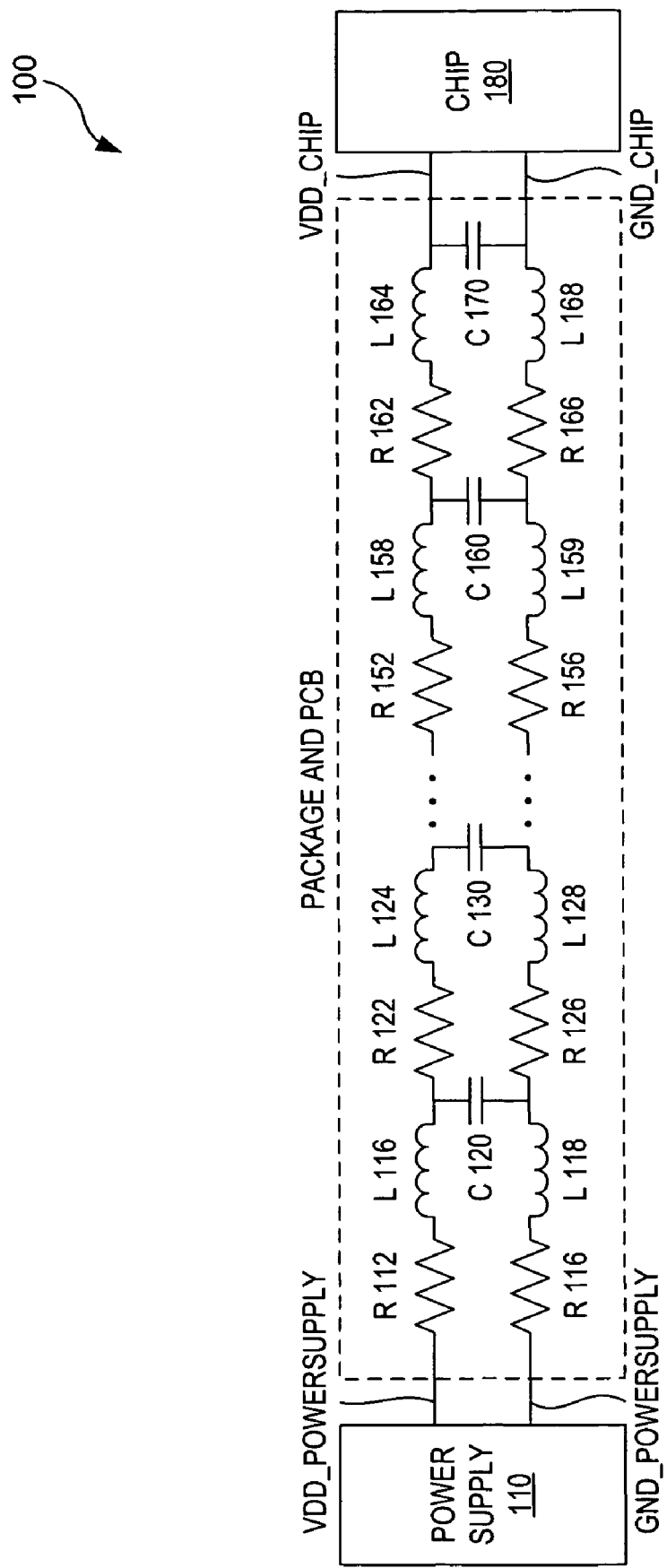
FIG. 1 schematically depicts a power supply source, package, printed circuit board (pcb), and chip in which, in part due to the parasitic series inductance and resistance present in the package and PCB, any transient current arising from the chip can result in transient voltage swing at VDD_CHIP and GND_CHIP.

Turning to FIG. 1, illustrated is a circuit 100 in which significant power surges can occur at the moment when the chip 180 operating frequency is changed. A power supply 110 is coupled to a resistor ("R") 112 and an R 116. The R 112 is coupled to an inductor ("L") 116, and the R 116 is coupled to an L 118. There is a capacitor ("C") 120 coupled between the L 116 and the L 118. The L 116 is coupled to an R 122, and the L 118 is coupled to an R 126.

The R 122 is coupled to L 124, and the R 126 is coupled to an L 128. There is a C 130 coupled between the L 124 and the L 128. The series of alternating resistors, inductors, and capacitors is repeated across the circuit, and is coupled to an R 152 and an R 156.

The R 152 is coupled to L 158, and the R 156 is coupled to an L 159. There is a C 160 coupled between the L 158 and the L 159. An R 162 is coupled to L 164, and an R 166 is coupled to an L 168. There is a C 170 coupled between the L 164 and the L 168. A chip 180 is coupled to the L 164 and the L 168. In FIG. 1, serious fluctuations can occur in the system 100 when the chip 180 changes from one clocking frequency to a second clocking frequency, thereby creating current surges within the various passive devices of FIG. 1.

Figure 2:
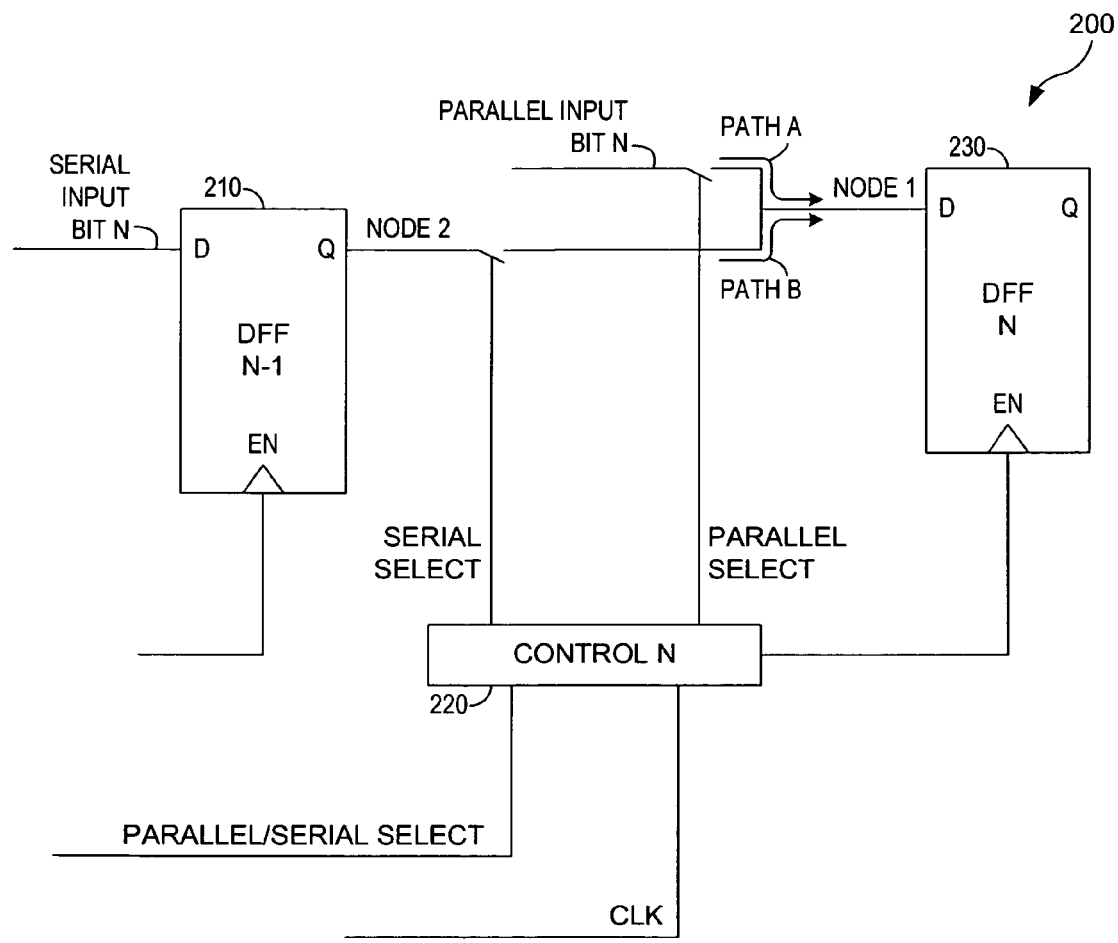
FIG. 2 illustrates a circuit for switching between a serial mode for circular bit shifting and a parallel mode for bit shifting.

The circuit 200 of FIG. 2 is to be used with a circuit that inputs a sequence of code patterns that will be loaded onto a shift register in a parallel manner. Once the loading process is complete, the shift register turns into a serial mode and runs the patterns in a round robin manner. The output of the shift register is then used to mask out specific pulses of the high frequency clock, thereby achieving the desired frequency division.

In the circuit 200, the output signal of a D-type flip flop (DFF) 210 is controlled by a Control N switch 220. The DFF 210 allows an input of a serial signal, having the round robin ones and zeroes. The Control N switch 220 selects either the round robin pulses or the parallel input bits that are to be loaded from the outside. The selected bit is loaded into a DFF 230.

However, the process of moving the shift register (not illustrated) in between parallel and serial modes has an inherent risk built into it. The Control N switch 220 has two control inputs. One is the clock signal (CLK) and the other is the control signal that tells the system to operate in serial (round robin) or parallel mode. The Control N switch 220 then takes in these signals and, in a synchronous, manner enables/disables the parallel and serial paths of the shift register.

One main risk for failure in this process happens during the transition from parallel to serial modes. During this mode, if the clock frequency is large, then there is a high risk of the wrong state latching onto the flip flops (FFs)/latches 210, 220 of the 'bit n' in the shift register.

For example, during the parallel mode of operation, path A in FIG. 2 is selected, and path B is disabled. When parallel mode is disabled and serial mode is enabled, path A is disabled while simultaneously path B is enabled. During this transition period, node 1, the input to 'bit n' of the shift register, can find itself in state that is not well defined.

Let the sample/hold time of DFF/latch 230 of bit n be $T_{sh}$. For ease of illustration, it takes $T_b$ time for signal from node 2 in FIG. 2 to arrive at node 1. Hence, the probability that the well-defined state at node 1 latching onto an undesired state increases as the magnitude of $T_b$ and $T_{sh}$ become comparable.

Because the shift register can be used to mask the PLL clock signals to generate lower frequency clocks, in one embodiment, the parallel bits are loaded and observed in the serial (round robin) output of the shift register at full speed to ensure the shift register contains the correct code.

Figure 3:
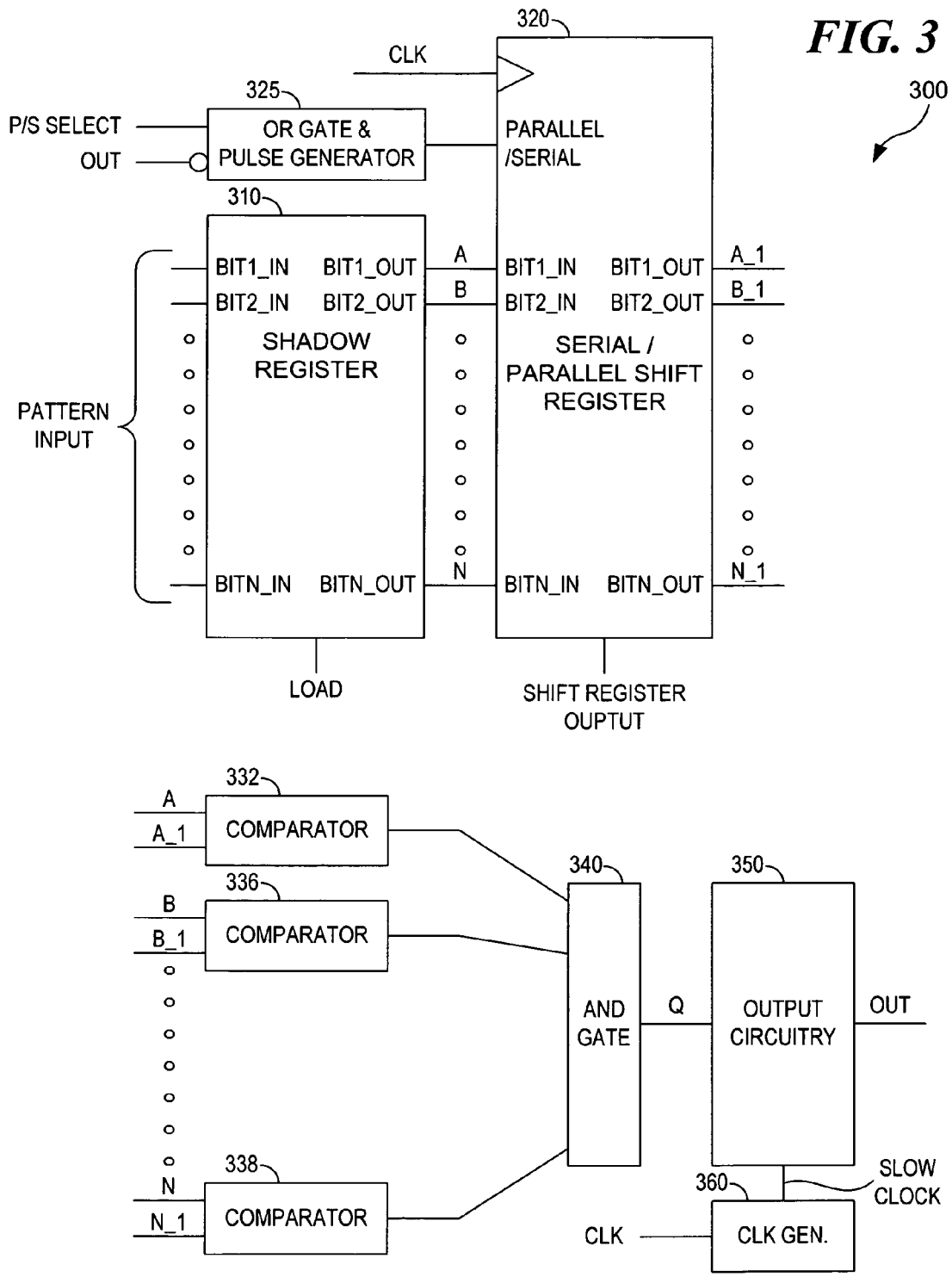
FIG. 3 illustrates a circuit for inputting control bits into another logic element.

Turning now to the circuit 300 of FIG. 3, illustrated is an apparatus employable for on-chip error detection and correction of code patterns for the proper operation of the circuit 300, or some other such frequency divisional circuit. Generally, the circuit 300 periodically detects functionality of the masking circuit, and then output a high or a low logic value indicating success or failure. For an n bit dI/dt reducing circuit, the circuit 300 checks proper functionality every n cycles. If an error is detected, then this error signal is further used to automatically replace the erroneous codes with accurate ones.

In the circuit 300, there are two shift registers: a serial/parallel shift register 320 and a shadow register 310. The output of the shadow register 310 is coupled to a serial/parallel shift register 320. The serial/parallel shift register 320 will receive data in a parallel fashion when node PARALLEL/SERIAL SELECT at the coupled OR gate 325 is in parallel mode. The OR gate 325 has a parallel/serial select Coupled to a first input, and an inverted OUT signal coupled to the second input. If either of the parallel/serial select value or the inverted OUT signal is a positive, then the serial parallel shift register 320 is commanded to load the bit sequence from the shadow register 310.

When the selector 325 is in serial mode, the serial/parallel shift register 320 will start to move its bits in a round robin fashion. The parallel inputs to the serial/parallel shift register 320 are provided by the outputs of the coupled shadow register 310. The shadow register 310 takes its values from external inputs and maintains these values until the 'load' signal is asserted to load the new set of values into the shadow register 310.

Each of these outputs, A, B . . . through N of the shadow register 310 are coupled to the input of its own corresponding comparator 332 through 338. Also, each output of the register 320 is also coupled into its own corresponding comparator 332 through 338. In the circuit 300, the stored values in the shadow register 310 are compared with the rotating outputs of the serial/parallel shift register 320 to help ascertain the validity of the bits in the dI/dt reducing circuit that masks frequency pulses. This comparison should become positive once every n cycles.

The comparators 332 through 338 are coupled to the inputs of an AND gate 340. The comparison is carried out using the n comparators 332 through 338 and the AND gate 340. If the values in the serial/parallel shift register 320 are equal to that stored in the shadow register 310, then there will be a pulse at node Q, the output of the AND gate 340, every "n" CLK cycles. The appearance or lack of a Q positive pulse is then used to properly program an output circuitry 350 coupled to the output of the AND gate 340, such that node OUT will display a logic value that indicates that the shadow register 310 and the serial parallel 320 are both in agreement.

However, if node Q of the AND gate 340 does not produce a pulse every "n" CLK cycles, then the output circuitry 350, coupled to the AND gate 340, will display a logic value that indicates an incorrect state. The digital output at node OUT which indicates an error condition can then be used to take corrective actions if necessary.

Coupled to an input of the output circuitry 350 is a clock divider/generator circuit 360. The clock divider/generator circuit 360 generates a clock pulse once every "n" clock signals, as the shift register 320 rotates a bit with every clock cycle. Therefore, the output circuitry 350 generates an Error/No Error signal once every "n" clock signals, corresponding to when the correct bits, in the order in which they were input, is loaded in nodes A-N of the register 320.

In the circuit 300, if OUT is low indicating an error then, this will create an inverted pulse at the coupled SERIAL/PARALLEL input of serial/parallel shift register 320. In this embodiment, for the duration of the pulse, the serial/parallel shift register 320 will be in parallel mode. The current code patterns that already are stored in the shadow register 310 are then reloaded into the shift/parallel shift register 320, and the cycle continues.

Figure 4:
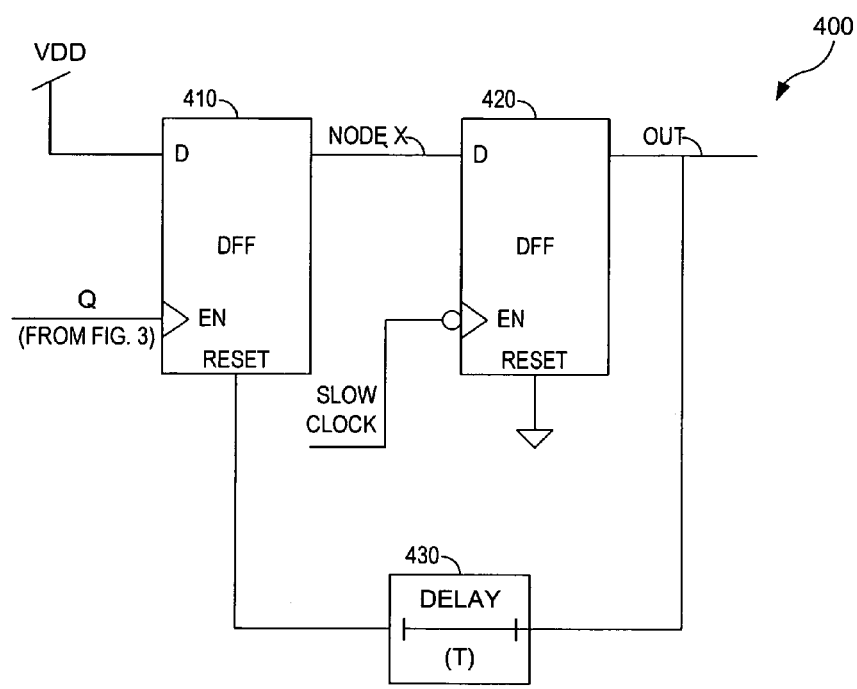
FIG. 4 illustrates some output logic of FIG. 3 in more detail.

Turning now to FIG. 4 illustrated is one circuit implementation of the output circuitry 350. The output of a first D flip flop (DFF) 410 is coupled to the input of a second flip flop (DFF) 420 in master-slave mode. The master DFF 410 is triggered by the pulse at node Q, the output of the AND 340. The clock divider/generator circuit 360 of FIG. 3 will generate a pulse every n cycles of CLK into the "slow clock"

enable of the DFF 420. This clock (called 'slow clock' in FIGS. 3 and 4) is intentionally phase shifted with respect to the ideal signal that will be expected at node Q. This prevents race condition between the master DFF 410 and slave DFF 420 as well erroneous resetting of the master DFF 410.

Assume high logic state at node Q corresponds to the state where the values in the serial/parallel shift register 320 and the shadow register 310 are equal. The pulse at node Q, corresponding to the node Q in FIG. 3, will enable the master DFF 410. Node X, the output of DFF 410, will subsequently become high ($V_{dd}$) as this was the value input into the DFF 410. After some duration, when the SLOW CLOCK is also high, node OUT will take the value of node X. That is, it becomes high. After some delay T, the master DFF 410 is reset so that node X then becomes low. Node OUT will retain its value for N CLK cycles, until the next SLOW CLK pulse arrives. Note that as long as the values in the serial/parallel shift register 320 and the shadow register 310 are equal for the selected clock cycle, node OUT will remain at high logic state permanently.

In the circuit 400, there is also a delay element 430 that introduces a delay equal to T. The input to delay element 430 is coupled to the output of the slave DFF 420. Delay 430's output will reset the master DFF 410. Once the output of DFF 420 goes high, and after a given delay (T), the DFF 410 is reset, and the value at node X goes, once again, to zero. Without the reset, the DFF 410 will always give a high value, even if Q is low, because the VDD input is always high. In this way, the DFF 410 circuit output gets reset.

Figure 5:
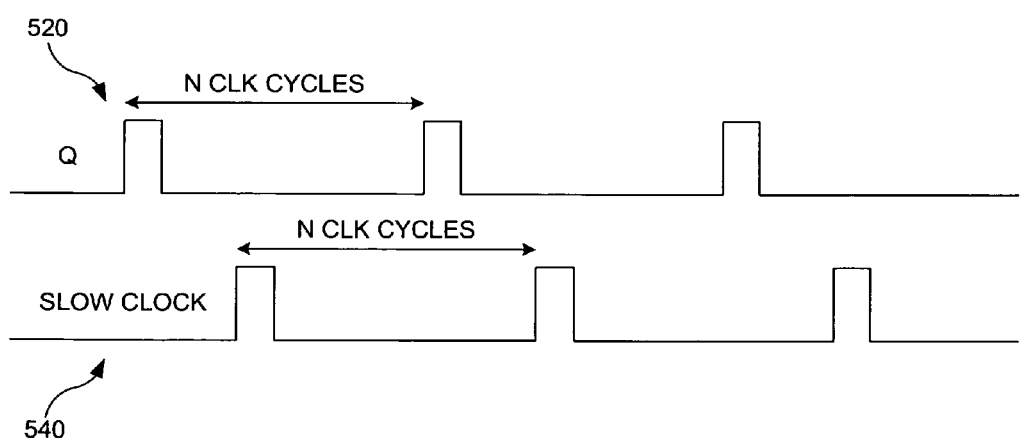
FIG. 5 illustrates a first and second clock cycles generated before and after the delay element of FIG. 4.

Turning now to FIG. 5, illustrated are some examples of typical timing diagrams of the signals at node Q (assuming the values in the serial/parallel shift register 320 and the shadow register 310 are equal) and SLOW CLOCK are shown. Assuming that there is no mismatch of loaded bits between the shadow register 310 and the parallel register 320, typical Q output are illustrated in the pulses 520, and a phase shifted SLOW CLOCK output 540.

Generally, the circuit 300 is capable of testing the validity (and making corrections if necessary) of code patterns in round robin type circuits that are running at very high frequency. The circuit 300 makes it possible to detect and correct errors on chip while chip is running at full speed.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A high frequency circuit for generating an error detection state and correction of code patterns running at full speed, comprising:
   a shadow register means having a plurality of pattern inputs and a plurality of shadow register outputs;
   a serial/parallel shift register having a plurality of inputs, wherein each input of the plurality of inputs is at least connected to at least one shadow register outputs, and wherein the serial/parallel shift register is at least configured to be selectively programmable to alternate between a serial mode and a parallel mode;
   a plurality of comparators each having a pair of inputs, wherein each input of each comparator is at least configured to be coupled to an output of the serial/parallel shift register;
   at least one logic gate that is at least configured to receive an output from each comparator of the plurality of comparators; and
   output circuitry that is at least configured to receive an output of the logic gate to generate a signal that is functionally related to the error detection state.

2. The apparatus of claim 1, wherein the logic gate further comprises an AND gate.

3. The apparatus of claim 1, wherein the output circuitry further comprises a plurality of cascaded flip-flops.

4. The apparatus of claim 3, wherein the plurality of cascaded flip-flops further comprises a pair of cascaded D flip-flops, wherein at least one D flip-flop receives an enable signal from the at least one logic gate and that is reset by a delayed output the pair of cascaded D flip-flops.

5. The apparatus of claim 1, wherein the apparatus further comprises a clock generator that is at least configured to output a slow clock signal to the output circuitry.

6. A high frequency circuit for generating an error detection state and correction of code patterns running at full speed, comprising:
   a shadow register that is at least configured to receive a plurality of pattern inputs;
   a serial/parallel shift register that is at least configured to receive output signals from the shadow register;
   a selector that provides a signal to the serial/parallel register to enter into a serial mode or a parallel mode; and
   an error detection state module that is at least configured to receive outputs of a serial/parallel shift register and that is at least configure to generate a signal that is functionally related to the error detection state.

7. The apparatus of claim 6, wherein the error detection state module further comprises:
   a plurality of comparators each having a pair of inputs, wherein each input of each comparator is at least configured to be coupled to an output of the serial/parallel shift register;
   at least one AND that is at least configured to receive an output from each comparator of the plurality of comparators; and
   output circuitry that is at least configured to receive an output of the logic gate to generate a signal that is functionally related to the error detection state.

8. The apparatus of claim 7, wherein the output circuitry further comprises a plurality of cascaded flip-flops.

9. The apparatus of claim 8, wherein the plurality of cascaded flip-flops further comprises a pair of cascaded D flip-flops, wherein at least one D flip-flop receives an enable signal from the at least one logic gate and that is reset by a delayed output the pair of cascaded D flip-flops.

10. The apparatus of claim 6, wherein the apparatus further comprises a clock generator that is at least configured to output a slow clock signal to the error detection state module.

11. A method for generating an error detection state and correction of code patterns running at full speed, comprising:

generating a plurality shadow register outputs;

selecting, for a shift register, a mode from the group consisting of a parallel mode and a serial mode;

producing shift register outputs from the mode and from the plurality of shadow register outputs; and generating an error detection state signal from the plurality of shift register outputs.

12. The method of claim 11, wherein the step of generating the plurality shadow register outputs further comprises receiving a plurality of pattern inputs.

13. The method of claim 11, wherein the step of generating the error detection state signal further comprises:

comparing outputs the plurality of shift register outputs with one another;

logically combining outputs of the comparisons; and generating a error detection state that is functionally related to the logically combined outputs of the comparisons.

14. The method of claim 13, wherein the step of logically combining further comprises ANDing the outputs of the comparisons.

15. A computer program product for generating an error detection state and correction of code patterns running at full speed, the computer program product having a medium with a computer program embodied thereon, the computer program comprising:

computer code for generating a plurality shadow register outputs;

computer code for selecting, for a shift register, a mode from the group consisting of a parallel mode and a serial mode;

computer code for producing shift register outputs from the mode and from the plurality of shadow register outputs; and computer code for generating an error detection state signal from the plurality of shift register outputs.

16. The computer program product of claim 15, wherein the computer code for generating the plurality shadow register outputs further comprises computer code for receiving a plurality of pattern inputs.

17. The computer program product of claim 15, wherein the computer code for generating the error detection state signal further comprises:

computer code for comparing outputs the plurality of shift register outputs with one another;

computer code for logically combining outputs of the comparisons; and computer code for generating a error detection state that is functionally related to the logically combined outputs of the comparisons.

18. The computer program product of claim 17, wherein the computer code for logically combining further comprises computer code for ANDing the outputs of the comparisons.

* * * * *